United States Patent [19]

Phillips

[11] Patent Number: 5,565,675
[45] Date of Patent: Oct. 15, 1996

[54] MECHANICALLY MOUNTED OPTICAL RECEIVER ASSEMBLY

[75] Inventor: Peter E. Phillips, Redondo Beach, Calif.

[73] Assignee: Hughes Electronics, Los Angeles, Calif.

[21] Appl. No.: 423,066

[22] Filed: Apr. 17, 1995

[51] Int. Cl.$^6$ .............................. H01J 5/02; H01J 40/14
[52] U.S. Cl. ..................... 250/239; 250/338.1; 269/903
[58] Field of Search ............................. 250/239, 559, 250/338.1; 428/901; 269/903, 287, 101

[56] References Cited

U.S. PATENT DOCUMENTS

| | | | |
|---|---|---|---|
| 3,395,439 | 8/1968 | Palesi et al. | 269/903 |
| 3,578,978 | 5/1969 | Laurent | 250/239 |
| 3,702,397 | 11/1972 | Firth et al. | 250/338.1 |
| 3,880,528 | 4/1975 | Petersen et al. | 250/239 |
| 5,013,911 | 5/1991 | Koshida et al. | 250/239 |
| 5,115,125 | 5/1992 | Biggs | 250/239 |

*Primary Examiner*—Stephone Allen
*Attorney, Agent, or Firm*—Michael W. Sales; Wanda K. Denson-Low

[57] ABSTRACT

An optical receiver assembly includes a generally flat, stainless steel optical receiver mount for mounting a KOVAR hybrid detector package above a printed wiring board, the detector package having a light transmissive window, a cap, and a mounting flange, the flange being mechanically fastened to the underside of the receiver mount such that the cap protrudes through the opening therein.

19 Claims, 3 Drawing Sheets

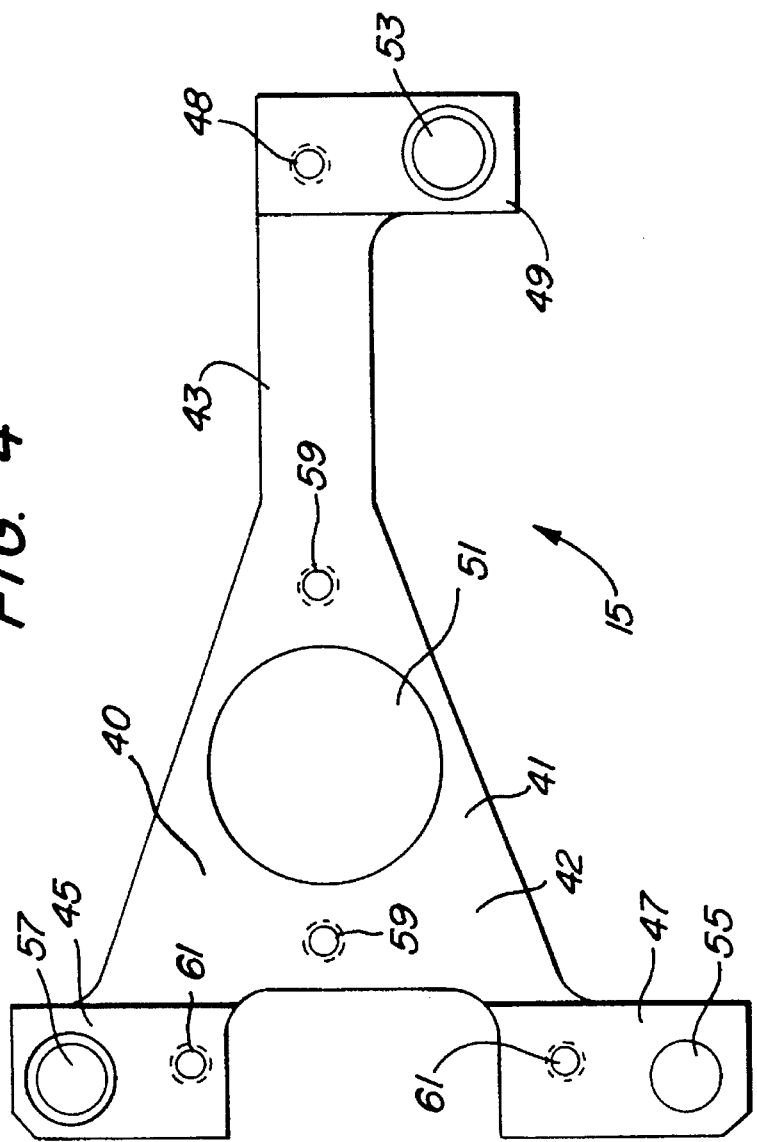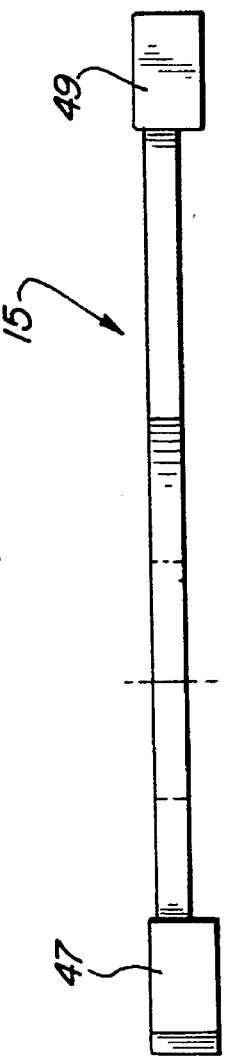

5,565,675

MECHANICALLY MOUNTED OPTICAL RECEIVER ASSEMBLY

BACKGROUND OF THE INVENTION

1. Field of the Invention

The subject invention relates to optical receivers and, more particularly, to a mechanical mounting and assembly technique for optical receiver apparatus which results in improved mechanical stability and performance.

2. Description of Related Art

Optical receivers such as are employed in laser range finders have conventionally included an optical receiver card carrying a photodetector element. The photodetector element may be a photodiode such as an avalanche photodiode (APD) or an acceptor-intrinsic donor (PIN) diode. The receiver card is mounted to a telescope or other device for directing optical energy onto the photodetector. Due to the small size of the active detection element, mechanical mounting stability is critical for optimum energy collecting performance. Prior art receiver designs have employed a large two-inch by two-inch hybrid electronics detector package mounted by bonding the hybrid housing to a molybdenum mount utilizing epoxy. The mechanical stability of the bond line between the hybrid housing and the molybdenum mount has not proved optimal or stable over temperature, particularly because epoxy creeps and cold-flows.

OBJECTS AND SUMMARY OF THE INVENTION

It is therefore an object of the invention to improve optical receivers;

It is another object of the invention to provide improved detector mounting in an optical receiver;

It is another object of the invention to increase the mechanical mounting stability and performance of optical receiver componentry; and It is another object of the invention to provide an optical receiver mounting assembly which improves the mounting stability of a hybrid detector package within the assembly and the overall stability of the interface between the optical receiver assembly and a cooperating optical mount such as a telescope.

According to the invention, a generally flat optical receiver mount is provided having an opening therein for receiving the protruding cap of a hybrid optical detector package. The cap is attached to a flange which is fastened to the underside of the receiver mount. The receiver mount is, in turn, fastened to a printed wiring board located beneath the mount and carrying various receiver componentry. The hybrid detector package, its interface electronics, and the optomechanical mounting apparatus are thus integrated into a compact, low-cost module, having inherently better mechanical stability resulting from the elimination of bonding material in the mounting scheme and the inclusion of mechanically fastened interfaces.

According to another aspect of the invention, materials are selected such that the coefficient of thermal expansion (CTE) of the receiver mount matches that of a cooperating optical interface mount, such as a telescope. Micro shifts of the detector over varying ambient temperatures are thereby eliminated. In a preferred embodiment, a three-point steel receiver mount is provided, as well as a small one-half-inch-diameter circular hybrid detector package, which is fastened to the steel receiver mount with screws, thereby providing a proven, mechanically stable detector mounting method.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 4 is a top view of a triangular mount according to the preferred embodiment; and FIG. 5 is a side view of the mount of FIG. 4.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a particularly stable and readily manufacturable optical receiver assembly.

Figure 1:
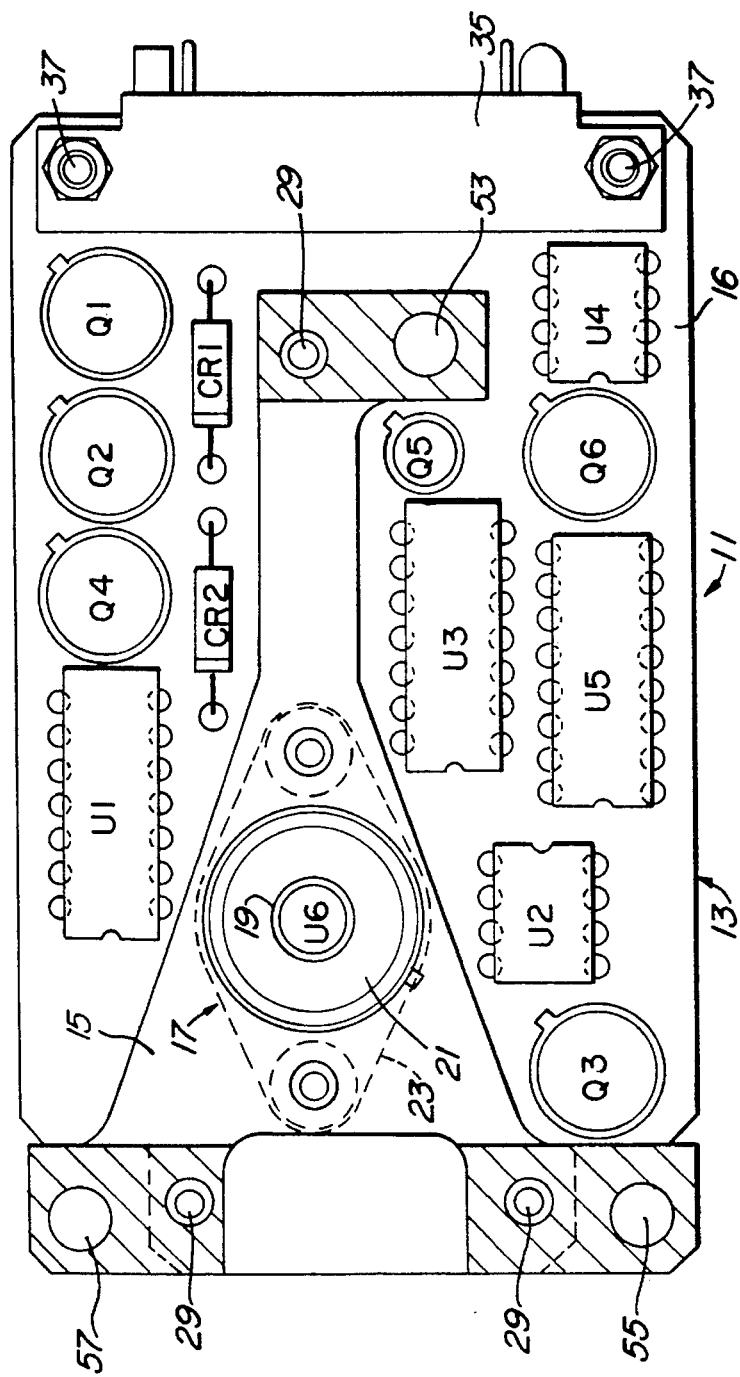
FIG. 1 is a top view of an optical receiver assembly according to the preferred embodiment.
Figure 2:
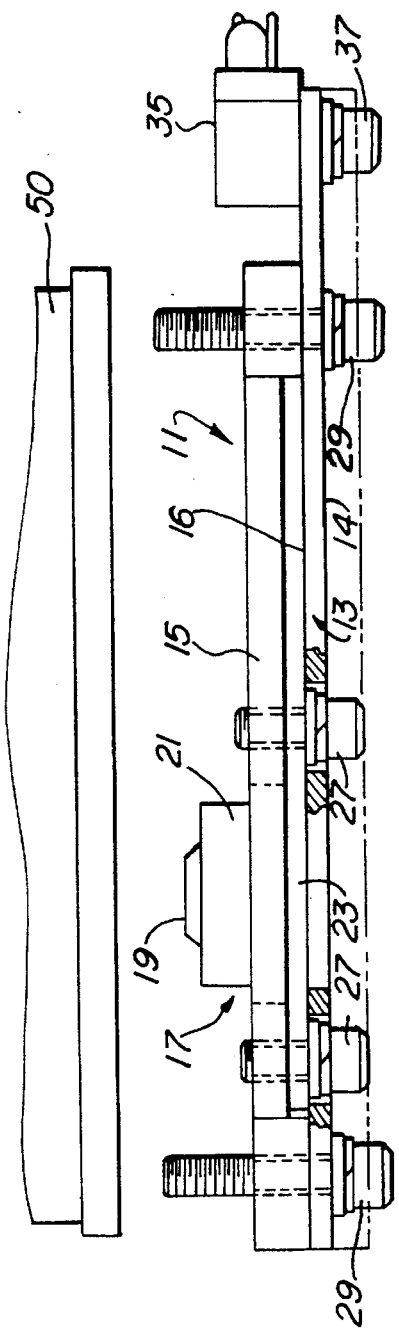
FIG. 2 is a side view of the receiver assembly of FIG. 1.
Figure 3:
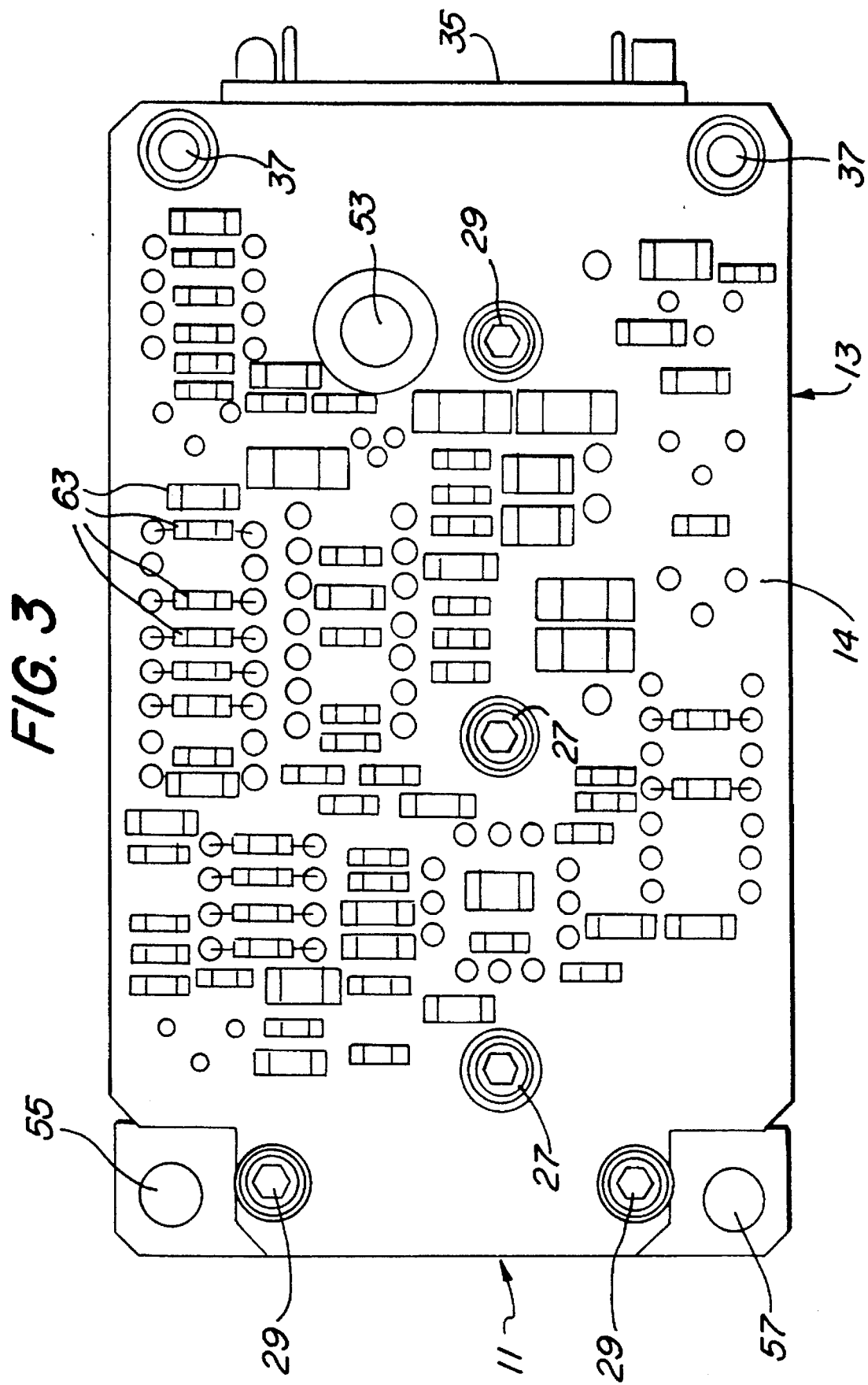
FIG. 3 is a bottom view of the receiver assembly of FIG. 1.

An optical receiver assembly 11 according to the preferred embodiment is illustrated in FIGS. 1–3. The receiver 11 includes a hybrid detector package 17, a printed wiring board 13, and an integral mechanical receiver mount 15 for mounting the detector package 17 to the printed wiring board 13. The receiver mount 15 is preferably fabricated of 416 stainless steel, while the printed wiring board 13 may be fabricated of polyamide or other conventional materials.

The detector package 17 employs a light transmissive sapphire window 19 mounted to a cover 21, for example, by solder sealing. The cover 21 is, in turn, mounted to a mounting flange 23. The cover 21 and flange 23 may comprise a standard T066 package having a hole cut in the cap thereof to accommodate the window 19.

The cap or cover 21 and the flange or base 23 are both made of KOVAR and are hermetically sealed to one another, for example, by soldering about the lower rim of the cap 21. The cap 21 covers a hybrid detector U6 including a ceramic substrate, such as alumina, having various components attached thereto. Such components may include, for example, an APD photodiode positioned beneath the sapphire window 19 to receive illumination therethrough and associated transimpedance amplifier (preamplifier) circuitry.

As shown in FIGS. 4 and 5, the receiver mount 15 has a generally triangular-shaped body 41 having a central opening 51 therein. The body 41 is extended via a leg 43 to a first interface mounting surface or pad 49. The opposite vertice regions 40, 42 of the body 41 integrally form into second and third respective interface mounting surfaces or pads 45, 47, having a first pair of bores 57, 55 and a second pair of bores 61 formed respectively therein. The mounting surface or pad 49 further has respective bores 48 and 53 formed therein, while the triangular body portion 41 has respective bores 59 formed therein on opposite sides of the central opening 51.

As may be seen in FIGS. 1 and 2, the detector hybrid package 17 is screwed to the receiver mount utilizing screws 27 threaded through respective tapped holes in the flange 23 and into the tapped holes 59 of the receiver mount 15. The receiver mount 15 is further screwed to the printed wiring board 13 by screws 29 threaded into tapped holes in the wiring board 13 located on the same axes as the tapped bores 48, 61 of the receiver mount 15. The three additional holes or bores 55, 57, 53 are formed in the receiver mount 15 in order to attach the receiver mount 15 and attendant printed wiring board 13 and hybrid 17 to a cooperating optical mount 50, for example, a telescope of a cooperating laser range finder apparatus.

The foregoing preferred embodiment provides minimal thermal mismatch over military environment temperature ranges, and therefore provides a mounting scheme which is extremely stable. In particular, the material of the receiver mount 15 is 416 stainless steel, as is the interfacing optical mount 50 attached via holes 55, 57, 53. The coefficient of thermal expansion of 416 stainless steel is 5.5 e-6/°F., while that of KOVAR is 3.35 e-6/°F., providing minimal thermal mismatch between the flange 23 and receiver mount 15.

Further advantages are attained according to the preferred embodiment by surface mounting of the passive receiver componentry 63 on the back side 14 of printed wiring board 13, as shown in FIG. 3, while mounting the active componentry on the top surface 16, as shown in FIG. 1. Such active componentry may include field effect transistors Q1, Q2, Q3, Q4, an optional PNP transistor Q5, and a PNP transistor Q6. The field effect transistors Q1, Q2, Q3, and Q4 may correspond to transistors $Q_{b1}$, $Q_{b2}$, $Q_{b3}$, $Q_{b4}$ of an APD photodetector bias voltage charging circuit as disclosed in U.S. patent application Ser. No. 08/460,483, filed Jun. 2, 1995, entitled "Temperature Compensated APD Detector Bias and Transimpedance Amplifier Circuitry" (Attorney Docket No. PD-94400) hereby incorporated herein by reference. The detector/preamp U6 may be further fabricated in accordance with the teachings of that disclosure so as to include an APD photodetector and a transimpedance amplifier.

The components U1, U2, U3, U4, U5 typically comprise various integrated circuits utilized by the receiver circuitry, for example, respectively comprising: an integrated circuit chip including multiple inverters; a dual op/amp integrated circuit; a quad op/amp integrated circuit; a voltage reference circuit, e.g., Part No. LM10J8; and an ECL comparator chip. In the embodiment illustrated in FIG. 1, two diodes CR1 and CR2, for example, a zener and PN diode, are also mounted on the top surface 14 of the printed wiring board 13. A 20 pin connector 35 is attached via screws 37 at one end of the printed wiring board 13. A very compact circuit packaging design results, which contributes to the overall compactness of the optical receiver assembly and to improved performance.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An optical receiver assembly comprising:

a generally flat receiver mount having a top surface, an underside, and an opening between said top surface and said underside;

a hybrid detector package having a light transmissive window, a cap, and a flange, the window being mounted in the cap, the cap being attached to the flange, the flange being attached to the underside of said receiver mount such that said cap protrudes through said opening of said receiver mount; and a planar printed wiring board means for mounting electronic receiver circuitry, said board being positioned beneath said flange and attached to said receiver mount.

2. The optical receiver assembly of claim 1 wherein said receiver mount has a generally triangular body, a leg extending from said body to a first interface pad, and second and third interface pads located adjacent respective vertice positions of said body.

3. The optical receiver assembly of claim 2 wherein said printed wiring board is generally rectangular in shape and wherein said body and leg are contained within the periphery of the printed wiring board.

4. The optical receiver assembly of claim 3 wherein each of said pads has a hole therein, each said hole being located above a corresponding hole in the printed wiring board and further including fastening means passing through respective pairs of holes and corresponding holes for attaching said receiver mount to said printed wiring board.

5. The optical receiver assembly of claim 4 wherein each of said pads has a mounting hole means therein for mechanically fastening the optical receiver assembly to a cooperating optical mount.

6. The optical receiver assembly of claim 5 wherein said receiver mount is fabricated of 416 stainless steel and said cap and flange are fabricated of KOVAR, said cap being hermetically sealed to said flange.

7. The optical receiver assembly of claim 6 wherein said optical mount is fabricated of 416 stainless steel.

8. The optical receiver assembly of claim 7 further including passive receiver componentry mounted on the underside of the printed wiring board and active receiver componentry mounted on the top surface of the printed wiring board.

9. The optical receiver assembly of claim 1 further including passive receiver componentry mounted on the underside of the printed wiring board and active receiver componentry mounted on the top surface of the printed wiring board.

10. The optical receiver assembly of claim 9 wherein said window is a sapphire window.

11. The optical receiver assembly of claim 10 wherein the cap is circular and has a diameter of one-half inch.

12. The optical receiver assembly of claim 11 wherein the dimensions of said printed wiring board are equal to or less than 2 inches wide by 3.5 inches in length.

13. The optical receiver assembly of claim 1 further including an optical detector hybrid circuit located beneath said light transmissive window.

14. The optical receiver assembly of claim 8 further including an optical detector hybrid circuit located beneath said light transmissive window.

15. The optical receiver assembly of claim 12 further including an optical detector hybrid circuit located beneath said light transmissive window.

16. The optical receiver assembly of claim 1, wherein said receiver mount is mechanically mounted to said printed wiring board.

17. The optical receiver assembly of claim 5 wherein said receiver mount is fabricated from a material having a coefficient of thermal expansion within 2.5 e-6/°F., of the coefficient of thermal expansion of the material used to fabricate said flange.

18. An optical receiver assembly comprising:

a hybrid detector package comprising a cap having a lower rim and a light transmissive window in a top surface thereof, the cap being hermetically sealed about its lower rim to a flange, said package further including an optical detector circuit located and sealed within said cad beneath said light transmissive window;

a printed wiring board means for mounting active and passive electronic receiver circuit componentry:

a receiver mounting means having an opening therein for mounting said hybrid detector package adjacent said printed wiring board such that said flange is attached to said mounting means and said cap of said hybrid detector package protrudes through said opening, wherein said receiver mounting means has a generally triangular body, a leg extending from said body to a first interface pad, and second and third interface pads located adjacent respective vertice positions of said body, said printed wiring board means being generally rectangular in shape, said body and leg being contained within the periphery of the printed wiring board, and wherein each of said first, second, and third pads has a hole therein, each said hole being located above a corresponding hole in the printed wiring board and further including mechanical fastening means passing through respective pairs of holes and corresponding holes for mechanically attaching said receiver mounting means to said printed wiring board means without adhesives; and means in said receiver mounting means for attaching said receiver mounting means to a cooperating optical mount.

19. The optical receiver assembly of claim 18 wherein said receiver mount is fabricated from a material having a coefficient of thermal expansion within 2.5 e-6/°F., of the coefficient of thermal expansion of the material used to fabricate said flange, whereby said optical receiver assembly is adapted to operate over wide temperature ranges.

* * * * *